R. C. DUNHAM.

Manufacture of Rubber-Coated Buckles, Rings, &c.

No. 5,172. Reissued Dec. 3, 1872.

Witnesses:

V. C. Clayton
J. G. Clayton.

Ralph C Dunham,
Inventor.
Andrew Albright
assignee,
by Atty, J. C. Clayton.

AM. PHOTO-LITHOGRAPHIC CO. N.Y. (OSBORNE'S PROCESS.)

UNITED STATES PATENT OFFICE.

RALPH C. DUNHAM, OF NEW BRITAIN, CONNECTICUT, ASSIGNOR, BY MESNE ASSIGNMENTS, TO ANDREW ALBRIGHT.

IMPROVEMENT IN THE MANUFACTURE OF RUBBER-COATED BUCKLES, RINGS, &c.

Specification forming part of Letters Patent No. 58,619, dated October 9, 1866; reissue No. 5,172, dated December 3, 1872.

DIVISION A.

*To all whom it may concern:*

Be it known that RALPH C. DUNHAM, of New Britain, Connecticut, has invented an Improvement in Manufacture of Rings and Buckles Covered with Vulcanized Rubber or Gutta-Percha, of which the following is a specification:

This invention is a new manufacture, being the manufacture of metallic rings and buckles covered with vulcanized rubber or gutta-percha.

Figure 1:
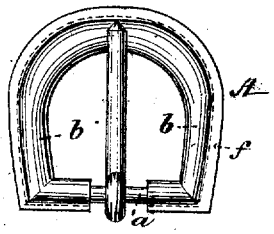
Figure 2:
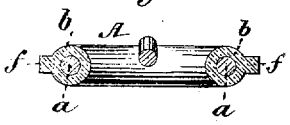

Figures 1 and 2 represent a covered buckle.

Metallic rings and buckles have heretofore been protected from rust chiefly by leather, by lacquer, or by gold or silver plating.

A coating of vulcanized rubber or gutta-percha or other known vulcanizable gum is much better, and may be applied as follows: The article *a* to be coated is first cleaned by washing and drying, so that there shall be no impurities between the metal and the coating. The usual vulcanizable composition *b* should then be applied, as described in Division B of this specification.

After the vulcanizable composition is applied the coated article (in or out of a mold) should be subjected to the action of heat in a vulcanizer until sufficiently vulcanized. The articles, after being vulcanized, are tumbled, finished, and polished like other articles of hard rubber.

Sometimes it is desirable to have the rings and buckles present the appearance of being covered with leather—that is, with an apparent lap or fold on the outer side. This effect is produced by forming an extra thickness or a double fold, *f*, of rubber on the outer edge of the ring or buckle, as shown at *f* in the drawing.

Indentations to imitate stitching can be made upon this projection.

What I claim as the invention of RALPH C. DUNHAM is—

As a new manufacture, metallic rings and buckles, with or without lap or edge *f*, covered with vulcanized rubber, gutta-percha, or other known vulcanizable gum.

ANDREW ALBRIGHT,
*Assignee of Ralph C. Dunham.*

Witnesses:
J. C. CLAYTON,
T. B. BEECHER.